Dec. 12, 1950     E. C. SWILIK     2,533,848
LIMITED MOVEMENT CLUTCH
Filed Oct. 6, 1948
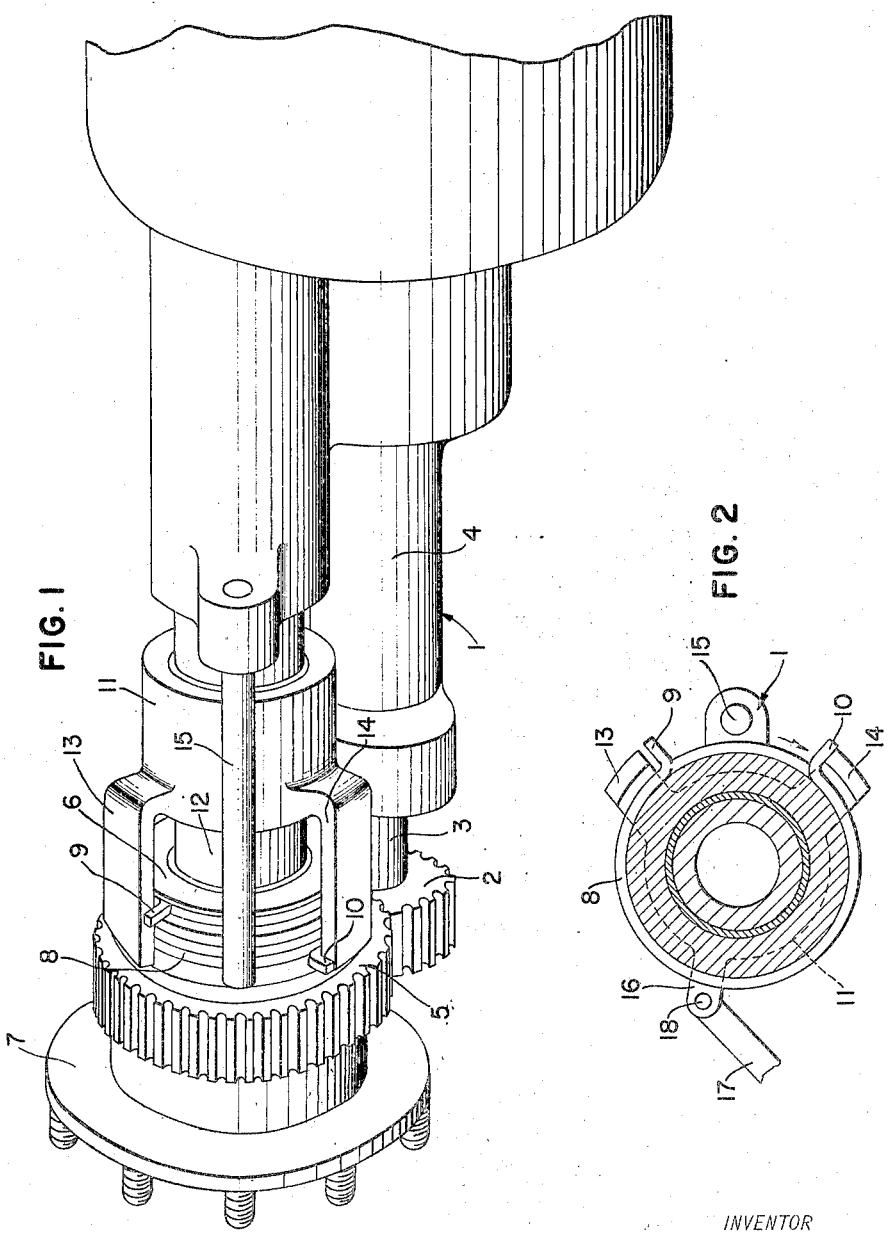
INVENTOR
EDWARD C. SWILIK
BY
*Oldham & Oldham*
ATTORNEYS Patented Dec. 12, 1950

2,533,848

UNITED STATES PATENT OFFICE 2,533,848

LIMITED MOVEMENT CLUTCH

Edward C. Swilik, Cleveland, Ohio

Application October 6, 1948, Serial No. 53,081

8 Claims. (Cl. 192—41)

1

This invention relates to clutches, particularly to a clutch wherein one of the clutch elements has a limited arcuate movement. One of the uses for clutches of the type disclosed herein is in mechanical ironers wherein it is desired to bring the ironer shoe into contact with the mangle shortly after rotation of the mangle is started. Thus a limited movement of one driven member is required to effect the desired movement in the controlled article.

The general object of the present invention is to provide a clutch device of the type referred to wherein the clutch is characterized by its uncomplicated construction from a minimum of parts.

Another object of the invention is to provide an inexpensive, compact clutch mechanism.

Another object of the invention is to provide a relatively rugged clutch construction which is adapted to have a long service life with a minimum of maintenance.

The foregoing and other objects and advantages of the invention will be made apparent as the specification proceeds.

Attention is now directed to the accompanying drawings wherein Fig. 1 is a perspective view of a clutch embodying the principles of the invention; and Fig. 2 is a cross section of the clutch of the invention.

Reference now is had to the details of the construction shown in the drawings and a clutch 1 is shown which clutch may include a driven gear 2 which is carried on a shaft 3 journalled in the frame 4 with the gear 2 being driven in any desired manner. This gear 2 is engaged with gear 5, shown of larger diameter than the gear 2 with the gear 5 being in fixed engagement with a driven hub 6 which may have a hub plate 7 secured thereto for connection with a member to be driven thereby.

As a feature of the present invention, the hub 6 carries a coil spring 8 which normally is in frictional engagement with the hub 6 and will rotate therewith. The means driving the gear 2 are adapted to drive this gear in either direction desired. Normally the ends of the coil spring 8 are substantially radially outwardly bent as at 9 and 10 so one of such spring ends will be a leading end of the coil spring and the other will be a trailing end, depending upon the direction of rotation of the hub 6. The spring 8 is of such a construction that a retarding force applied to the trailing end of the spring 8 will slightly expand the spring and free the spring from frictional engagement with the hub 6 so that relatively rotational movement will occur therebetween.

The clutch mechanism 1 to be controlled through the spring 8 in this instance comprises a sleeve 11 which is journaled on a relatively large tubular shaft 12 that also may have the hub 6

2 journaled therein, as indicated in Fig. 1 of the drawing. The shaft 12 extends into an upper portion of the frame 4 and is suitably positioned thereby. The sleeve 11 is shown provided with axially extending clutch arms 13 and 14 which are positioned radially outward of the sleeve 11 and extend substantially parallel to the axis of the shaft 12. These clutch arms 13 and 14 are adapted to engage with the ends 9 and 10 of the coil spring and are positioned circumferentially outside of the adjacent portions of the coil spring ends. Thus upon rotation of the hub 6 in either direction, one of the coil spring ends will strike one of the clutch arms 13 or 14 and occasion arcuate movement of the sleeve 11.

A limited movement for the sleeve 11 is provided by means of a stop finger 15 which is secured to the frame 4 and extends therefrom, in this instance, in a direction substantially parallel to the axis of the shaft 12. This stop finger 15 is adapted to be struck by one of the ends of the coil spring, depending upon the direction of rotation of the hub 6. The arrangement of the apparatus is such that the trailing end of the coil spring will be struck by the stop finger 15 in each instance whereby the release action of the coil spring 8 will be effected when such trailing spring end abuts against the finger 15.

Fig. 2 best shows that there is a slight clearance provided between the adjacent surfaces of the spring ends 9 and 10 and the clutch arms 13 and 14. Hence when the operating spring end strikes the stop finger 15, such trailing portion of the spring can be forced backwardly slightly off the hub to free the coil spring from frictional engagement therewith.

Fig. 2 shows that a bracket 16 may be formed integrally with the sleeve 11 and it is adapted to have an operating link 17 pivotally secured thereto by a pin 18. Thus arcuate movement of the sleeve 11 by the spring 8 will move the operating link 17 through a desired arc to effect a desired control action thereby. It will be seen that the rotation of the hub 6 will have to be reversed in order to effect a release of the original action effected by movement of the sleeve 11 through an arc so that such sleeve will be given a return action only upon reversal of the drive of the gear 2 which drives the clutch of the invention. Hence when alternate driving actions are desired in order to effect an automatic movement of the clutch sleeve 11 upon each independent driving impulse supplied to the clutch 1, then a reverse device should be provided for the shaft 3 so that it will rotate in an opposite direction with each new driving impulse supplied thereto.

In some instances, it may be desirable to have the sleeve 11 positioned on a member independent of that member carrying the hub 6. Also, the clutch arms 13 and 14 and the end sections of the spring may have any desired configuration for engagement therebetween to move the trailing spring portion outwardly of the member carrying same. Figs. 1 and 2 show the clutch in an intermediate position moving in the direction indicated.

It will be seen that the clutch of the invention is made from a minimum number of parts and that effective clutch action can be secured thereby for performing clutching action wherein only relatively small forces are involved.

While one complete embodiment of the invention has been disclosed herein, it will be appreciated that modification of this particular embodiment of the invention may be resorted to without departing from the scope of the invention as defined by the appended claims.

Having thus described my invention what I claim is:

1. In a clutch, a driven rotatable member, a coil spring in frictional engagement with said member and having end portions, a control member having a pair of protruding portions extending from circumferentially spaced sections thereof, each of said portions of said control member being positioned to be engaged with an opposite end portion of said coil spring to be moved thereby in a direction dependent upon the direction of rotation of said driven member, and a stop member positioned circumferentially intermediate the end portions of said coil spring and positioned to be struck by same upon rotation of said coil spring through a predetermined arc to prevent further rotation of said coil spring and control member.

2. In a clutch as in claim 1, said rotatable member being adapted to be driven in either direction and said coil spring being engaged with such member on the initial movement of same in either direction.

3. In a clutch, a driven rotatable member, a coil spring in frictional engagement with said member and having end portions extending therefrom, a control member having a pair of portions extending from circumferentially spaced sections thereof, a shaft, both of said members being carried by said shaft, each of said portions of said control member being positioned to be engaged with an opposite end portion of said coil spring dependent upon the direction of rotation of said driven member, and a stop member positioned intermediate the end portions of said coil spring and positioned to be struck by same upon rotation of said coil spring through a predetermined arc to prevent further rotation of said coil spring and control member.

4. A clutch comprising a shaft, a hub journaled on said shaft, means for driving said hub, a coil spring in telescoped engagement with said hub and normally frictionally engaged therewith, said spring having outwardly extending ends at circumferentially spaced portions thereof, a sleeve journaled on said shaft, means coupled to said sleeve for limited movement thereby, said sleeve having two circumferentially spaced clutch arms extending axially therefrom and adapted to abut individually upon the ends of said spring, dependent upon the direction of rotation of said hub, said clutch arms being circumferentially spaced farther than said spring ends, and a stop bar fixedly secured in a position intermediate said spring ends whereby the following end of said spring will strike said stop bar and occasion slight expansion of said spring to take it out of engagement with said hub.

5. A clutch comprising a shaft, a hub member journaled on said shaft, means for driving said hub member, a coil spring in telescoped engagement with said hub member and normally frictionally engaged therewith, said spring having outwardly extending ends at circumferentially spaced portions thereof, a sleeve journaled on said shaft, said sleeve having two circumferentially spaced clutch arms extending axially therefrom and adapted to engage individually with the ends of said spring, said clutch arms being circumferentially spaced farther than said spring ends, and a stop bar fixedly secured in a position intermediate said spring ends whereby the following end of said spring will strike said stop bar and occasion slight expansion of said spring to take it out of engagement with said hub member, movement of said sleeve also being terminated by said stop bar.

6. In a clutch, a driven rotatable member, a coil spring in frictional engagement with said member and having end portions, a control member having a pair of contact portions on circumferentially spaced sections thereof with each such contact portion being in the path of movement of an end portion of said spring to be struck thereby on movement of said spring with said rotatable member to move said control member arcuately, and a stop member positioned circumferentially intermediate the end portions of said spring for engagement with the trailing end of said spring on arcuate movement thereof to prevent further rotation of said spring and control member.

7. A clutch as in claim 6 wherein said coil spring ends project substantially radially therefrom, and a journal member positions said control member.

8. In a clutch, a driven rotatable member, a coil spring in frictional engagement with said member and having end portions extending therefrom, an arcuately movable control member having a pair of axially directed portions extending from circumferentially spaced sections thereof, each of said portions of said control member being positioned to be engaged with an end portion of said coil spring dependent upon the direction of rotation of said driven member, and a stop member positioned intermediate the end portions of said coil spring and positioned to be struck by same upon rotation of said coil spring through a predetermined arc to prevent further rotation of said coil spring and control member.

EDWARD C. SWILIK.

REFERENCES CITED

The following references are of record in the file of this patent:

UNITED STATES PATENTS

| Number | Name | Date |
|---|---|---|
| 801,728 | Lindsay | Oct. 10, 1905 |

FOREIGN PATENTS

| Number | Country | Date |
|---|---|---|
| 473,117 | Germany | Mar. 9, 1929 |